United States Patent [19]

Busse et al.

[11] 4,076,033
[45] Feb. 28, 1978

[54] SPRAYING APPARATUS FOR CLEANING FILTER PRESS PLATES

[75] Inventors: Oswald Busse; Hugo Klesper, both of Aarbergen, Germany

[73] Assignee: Passavant-Werke Michelbacher Hutte, Germany

[21] Appl. No.: 701,081

[22] Filed: Jun. 30, 1976

[30] Foreign Application Priority Data

Jul. 3, 1975 Germany .................. 7521093[U]

[51] Int. Cl.² ............................................. B08B 3/02
[52] U.S. Cl. ...................................... 134/172; 134/181; 134/198; 118/315; 118/323; 239/186; 239/536
[58] Field of Search .................. 134/166 R–168 R, 134/172, 178, 180–181, 198; 118/315, 323; 239/184–186, 390, 436, 444, 536

[56] References Cited

U.S. PATENT DOCUMENTS

| | | | |
|---|---|---|---|
| 2,194,071 | 3/1940 | Hine | 134/172 UX |
| 2,581,957 | 1/1952 | Jones | 118/323 X |
| 3,159,472 | 12/1964 | Revell | 134/172 X |
| 3,780,747 | 12/1973 | Stadie et al. | 134/172 X |
| 3,961,752 | 6/1976 | Doeksen | 134/181 X |

FOREIGN PATENT DOCUMENTS 445,455 2/1968 Switzerland .................. 134/167 R Primary Examiner—Robert L. Bleutge
Attorney, Agent, or Firm—Woodford R. Thompson, Jr.

[57] ABSTRACT

Spraying apparatus for cleaning filter press plates which are slidable along horizontal guides. A spray unit is provided with at least one row of spray nozzles located at spaced apart locations thereon and directed at the vertical surface of an adjacent filter plate. The spray unit is reciprocated over a distance equalling the distance across the filter plate to be cleaned whereby spaced apart areas are sprayed by the nozzles of the row of nozzles as the spray unit makes one run relative to the filter plate. Spray nozzles are positioned on the spray unit during the return run thereof between the spaced apart locations of the nozzles of the row of nozzles to spray the areas between the previously sprayed spaced apart areas on the return run of the spray unit. Fluid is supplied under pressure to the row of spray nozzles as the spray unit makes one run and to the spray nozzles located between the spaced apart locations as the spray unit makes its return run.

13 Claims, 6 Drawing Figures

SPRAYING APPARATUS FOR CLEANING FILTER PRESS PLATES

BACKGROUND OF THE INVENTION

This invention relates to spraying apparatus for cleaning horizontally displaceable filter plates of a plate filter press.

In plate filter presses, especially those used to dewater sewage sludges, filter cake accumulates in the chambers formed between adjacent filter plates and is discarded when the plates are pulled apart. The filter cloth disposed on the plates tends to get clogged after a certain period of operation, thus causing a considerable decrease in permeability of the cloth as well as a decrease of filtering rates and performance. Accordingly, the filter cloth must be cleaned from time to time.

Usually conventional spray tubes have been employed for this purpose with the nozzles thereof being directed toward the filter surface to be cleaned. Such tubes are supplied with water under pressure and moved along the surface to be cleaned in a horizontal or vertical direction, depending upon their arrangement.

As is well known, the higher the water pressure and the smaller the contact area of each water jet, the better the cleaning efficiency of the device. On the other hand, it is impossible to arrange the spray nozzles close enough to each other so that the entire surface will be swept in one continuous run or stretch. One attempt to solve this problem has been to use nozzles which spray a wide pattern. However, such nozzles have a relatively poor cleaning efficiency.

SUMMARY OF THE INVENTION

An object of our invention is to provide a simple spray unit which shall be particularly adapted for cleaning filter media. In accordance with our invention, both runs of the spraying tube are made active runs. That is, a second row of jets is arranged with its jets at locations between the jets of the first row of jets which are operable on the first or outgoing run of the spray unit. The second row of jets is operable on the return run of the spray unit. The filter surface is thus cleaned partially on the first or outgoing run by the first row of jets leaving uncleaned areas which will then be cleaned by the second row of jets on the return run of the spray unit. According to our invention the filter surfaces are completely cleaned without the necessity of idle runs when the spray unit is returned to its initial position. An important feature of our invention lies in the fact that the cone of dispersion defines a maximum angle of approximately 60°. The high water pressure employed being approximately 100 bars (1450 PSI) or more assures excellent cleaning across the filter medium.

DESCRIPTION OF THE DRAWINGS

Apparatus embodying features of our invention is shown in the accompanying drawings, in which.

DETAILED DESCRIPTION

Figure 1:
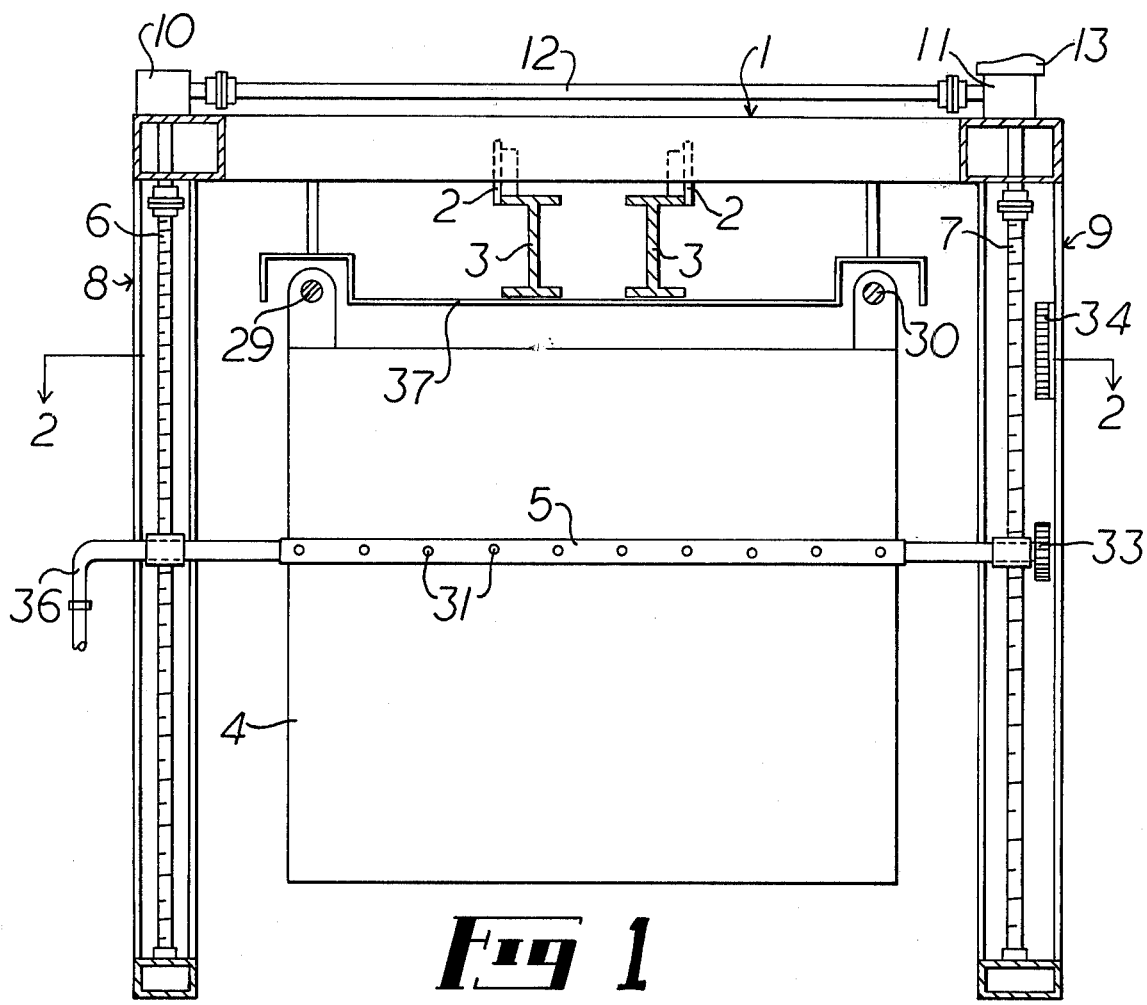
FIG. 1 is a vertical, longitudinal sectional view showing one embodiment of our invention.
Figure 2:
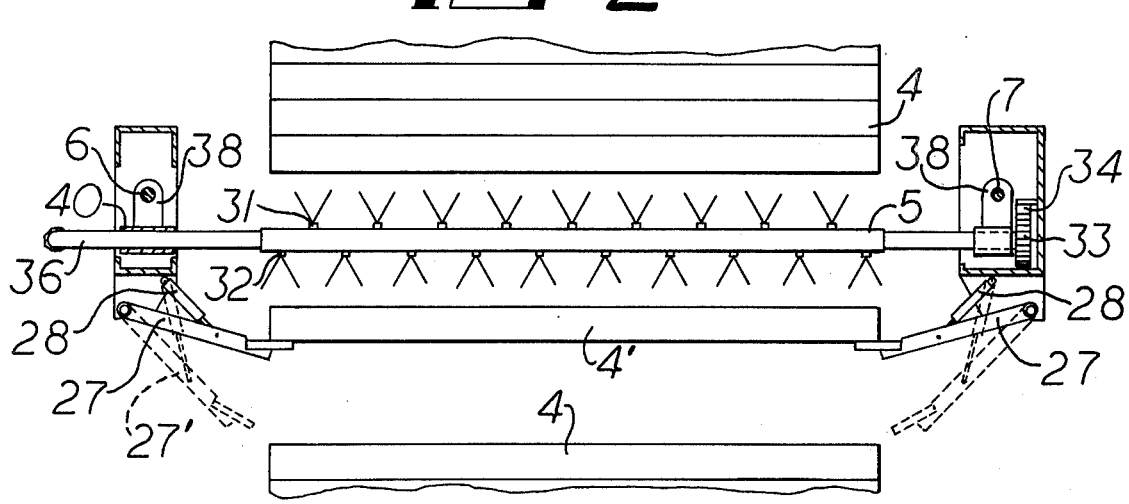
FIG. 2 is a horizontal sectional view taken generally along the line 2—2 of FIG. 1.

Referring now to FIGS. 1 and 2 of the drawings, we show a spray unit comprising two rows of spray nozzles 31 and 32 directed in opposite directions and being staggered relative to one another by approximately half the spacing between nozzles in a longitudinal direction. The spray tube 5 is provided with a rotatable unit which may be in the form of a ratchet 33 and 34 by means of which the tube 5 may be rotated 180° about its longitudinal axis adjacent at least one point that reverse movement takes place in the reciprocation of tube 5. Nozzles 31 and 32 having flushed one half of the plate surface during the first or outgoing run of the spray unit will then clean the remaining uncleaned portions on the opposite plate surfaces during the return run of the apparatus. Spray water is supplied continuously to the spray tube 5 by a hose 36 even when the latter is being reversed. Accordingly, it is desirable to provide a spray water guard 37 at least at one of the reversal points of the tube 5, which is not at the inoperative or lower position of the spray tube 5 so as to defect the water jets and protect the surroundings from splash water.

The spraying unit is carried by a U-shaped frame 1 which, by means of an undercarriage 2, is movable along longitudinal tracks 3 of the filter press and extends above the stack of filter plates indicated at 4. The drive means for the spray tube 5 comprises threaded spindles 6 and 7 which are supported within vertical housing members 8 and 9, respectively. Miter gears 10 and 11 and a horizontal shaft 12 synchronously transmit rotary movement from a drive motor 13 to both the spindles 6 and 7. Internally threaded members 38 carried by sleeves 40 at opposite ends of the tube 5 receive the threaded spindles 6 and 7 whereby the tube 5 moves with the members 38 as the spindles 6 and 7 are rotated.

Figure 3:
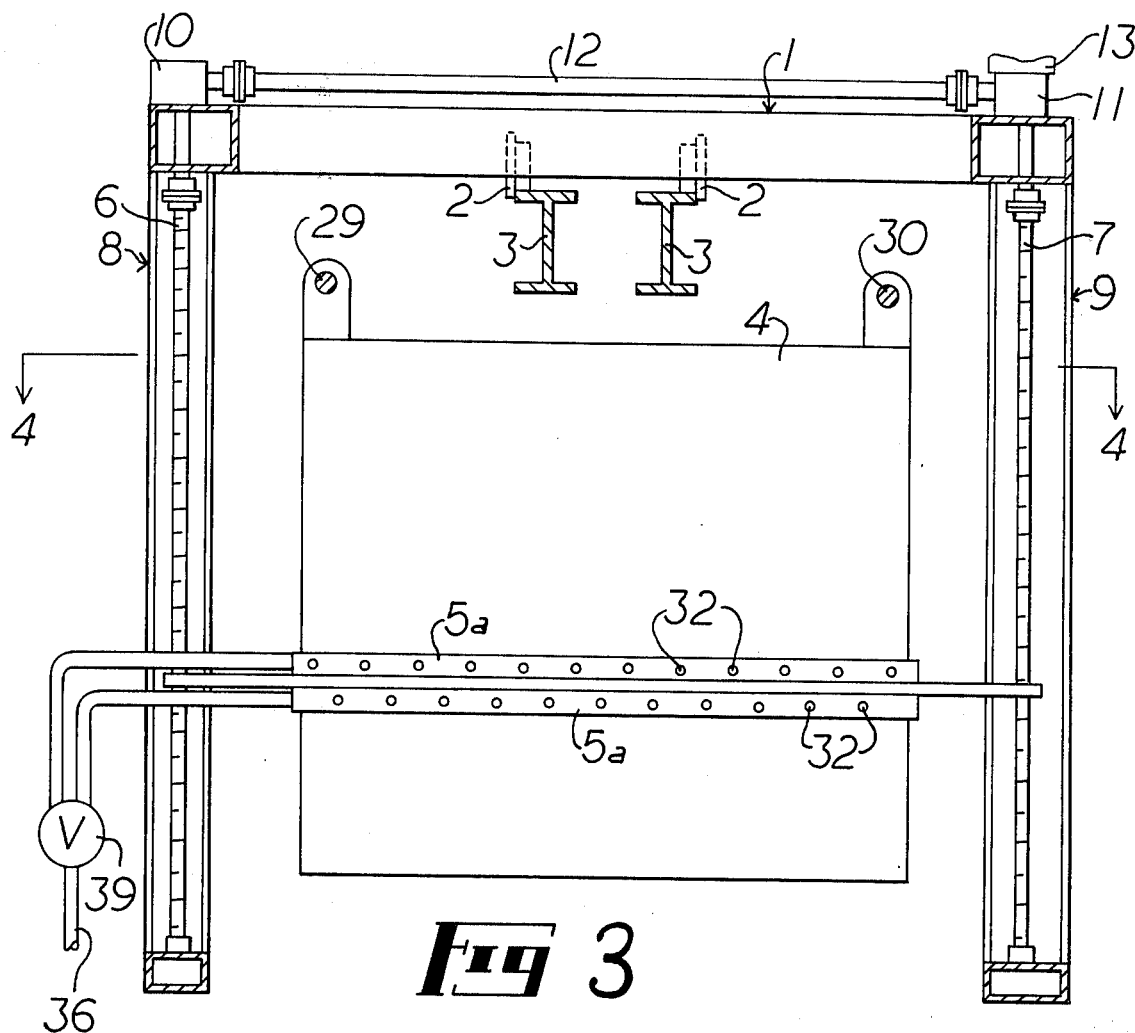
FIG. 3 is a vertical, longitudinal sectional view showing another embodiment of our invention.
Figure 4:
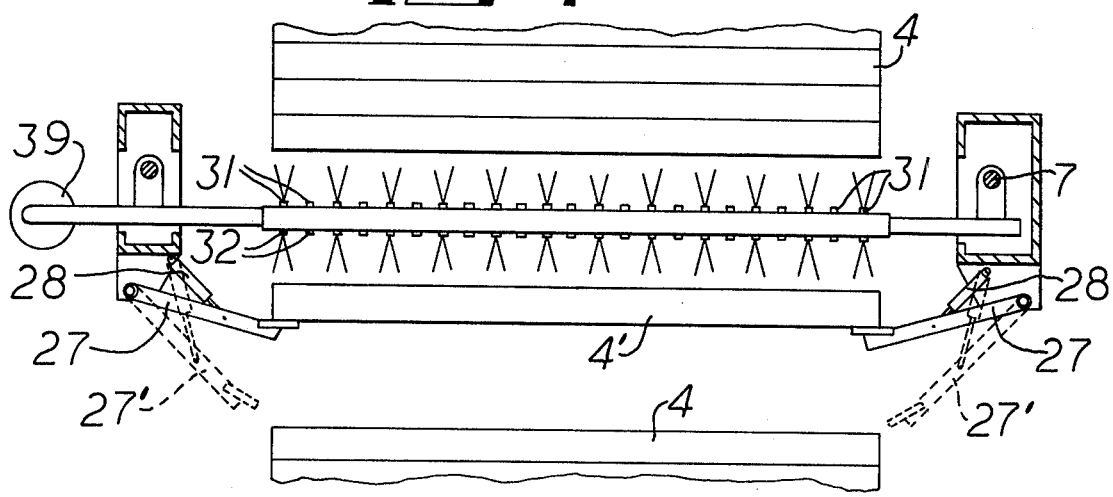
FIG. 4 is a horizontal sectional view taken generally along the line 4—4 of FIG. 3.

Another embodiment of our invention is shown in FIGS. 3 and 4, wherein cleaning of the filter media is carried out by two spray tubes $5^a$ disposed one behind the other in the direction of movement. That is, they extend generally parallel to each other in a common vertical plane extending in the direction of movement. The tubes communicate with a common spray water supply pipe, such as hose 36, by means of a reversing valve 39 at the reversal points of the tubes $5^a$. A row of spray nozzles 31 is provided on the same side of each of the spray tubes $5^a$ while a row of spray nozzles 32 is provided on the opposite side of each of the spray tubes $5^a$. The rows of spray nozzles 31 or 32, as the case may be, disposed on the same side of the tubes $5^a$ are staggered relative to each other by an amount equalling half the nozzle spacing and in a direction longitudinal of the tube, as shown. On the outgoing or first run of the spray with only the row of nozzles mounted on the tube 5a connected by valve 39 to the hose 36 is in operation, and on the return run the nozzles of the other tube 5a will be connected by valve 39 to hose 36 and will flush the remaining sections of the filter cloth which were not cleaned on the first run. The advantage of this embodiment is that the spray pipes 5a, except for the reciprocating movement along the filter plates by the threaded spindles 6 and 7 described above, do not have to carry out any further movement. Also, except for the reversing valve 39 no accessory parts are required.

Figure 5:
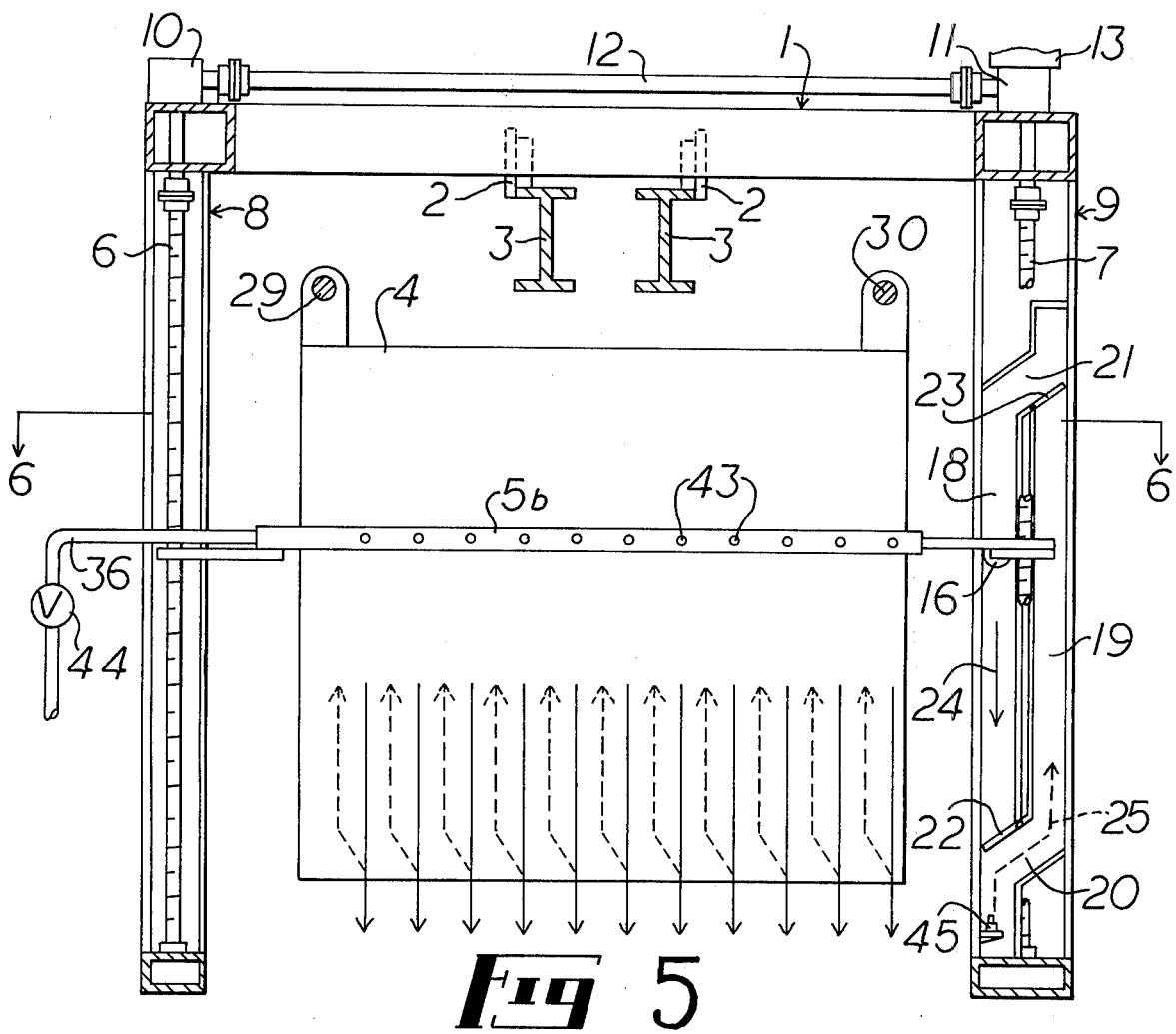
FIG. 5 is a vertical, longitudinal sectional view showing another embodiment of our invention; and, FIG. 6 is a horizontal sectional view taken generally along the line 6—6 of FIG. 5.
Figure 6:
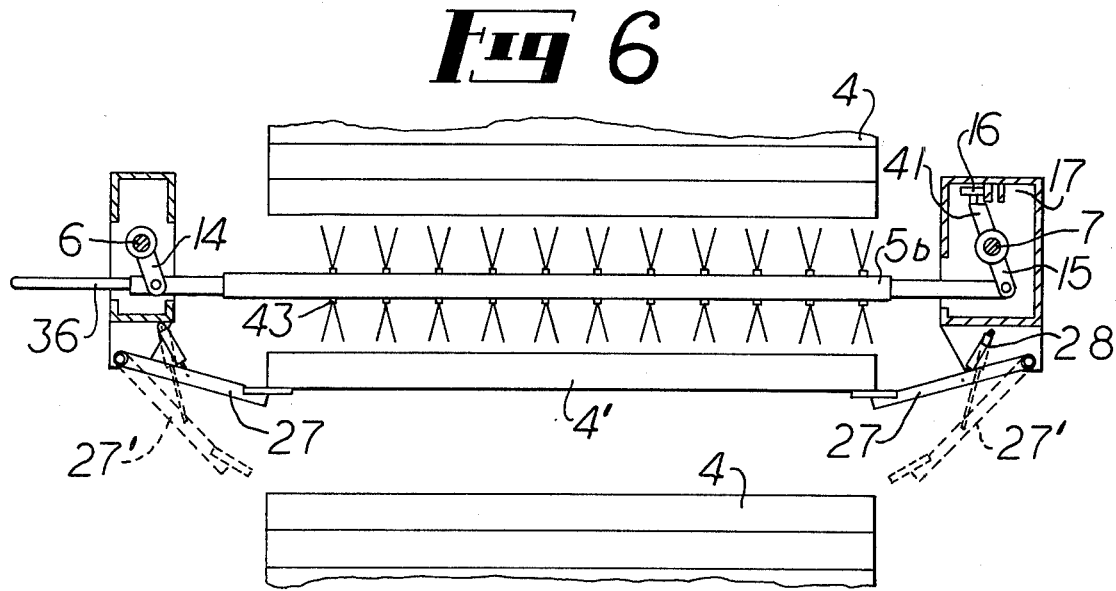

In FIGS. 5 and 6 of the drawings we show another embodiment having only one spray tube 5b. This embodiment differs from the others described above in that the spray tube 5b is equipped with a shifting device for automatic displacement of the spray tube 5b in a longitudinal direction. The displacement of the spray tube 5b is by one half of the nozzle spacing and is made at the reversal points of the spray unit. Also, in this embodiment the spray tube 56 on either run will clean only half of the two filter surfaces and leave uncleaned areas therebetween which will be flushed on the return run of the tube 5b. In this embodiment we employ the threaded spindles 6 and 7, described above, arranged on each side of the stack of plates and synchronously rotatable in either direction by shaft 12 and motor 13 as a means for moving the spray tube 5b vertically. Longitudinal displacement of the tube 5b is accomplished by connecting opposite ends thereof to rocking levers 14 and 15 which in turn are pivotally connected to the spindles 6 and 7. This configuration is especially compact since the threaded spindles 6 and 7 serve as pivotal axes for the rocking levers 14 and 15. Automatic displacement of the tube 5b is accomplished by providing at least one of said levers, such as lever 15, with a member 41 which extends beyond its pivotal axis and engages a closed loop guide track unit 17. The guide track unit 17 comprises two adjacent tracks 18 and 19 connected at their respective ends by a connecting section 20 and 21 for crossing over. The connecting sections or transition points 20 and 21 are provided with weight loaded switch elements 22 and 23 respectively, which, when the tube 5b has passed one way automatically switches over to the return track. For operation of the spray tube 5b the motor 13 and gear drive are turned on the same time as the water supply from hose 36. A limit switch or other suitable means is positioned at the reversal points of tube 5b so as to reverse the direction of travel.

As shown in FIG. 6 the spray tube 5b attached to rocking levers 14 and 15 thus has pivotal axes formed by internally threaded members which engage the spindles 6 and 7. The portin of lever 15 which extends beyond its pivot axis carries a guide roller 16 which rides in the guide track unit 17 which in turn is mounted on the vertical housing member 9. When the spray tube 5b moves downwardly in the lefthand track 18, in the direction indicated by arrow 24, it will force open the lower switch 22 which thereafter will return by its own weight to its closed position. Then, when the spray tube 5b moves up again, the guide roller 16 is shifted by switch 22 into the righthand track 19, with the rocking lever 15 displacing the spray tube 5b to the left, as viewed in FIG. 6, by half a nozzle spacing. The single armed lever 14 on the left end of tube 5b will maintain the spray tube 5b thus shifted in parallel alignment with the filter plate surface. On the upward run, indicated by a broken line arrow 25, the spray jets indicated at 43 will then clean the strips represented in FIG. 5 by broken lines and arrow heads. The spray water is introduced into the spray tube 5b through the hose 36 having a suitable control valve 44 therein.

When a filter plate 4' of each of the above described embodiments is pulled away from the stack of filter plates 4 it is likely to be displaced by the flushing water from jets impinging thereon at high velocity. In order to prevent this the plate 4' is locked by swingable arms 27 arranged at both sides of the stack of filter plates. These arms are actuated by pneumatic or hydraulic rocking units 28. In the position indicated by broken lines 27' the arms are moved a sufficient distance outwardly to permit passage of the cleaned filter plate 4'.

Preferably the cleaning process is started when the spray tube is in its lowermost position wherein the filter plates can pass clear of the tube. Since the space below and laterally of the filter plates is then no longer available for installation of suitable guide means for preventing lateral movement of the plates, such guide means indicated at 29 and 30 will be disposed above the filter plate corners, as shown.

Generally, cleaning is effected in the following manner: each filter plate is pulled off the stack of plates and stopped at a sufficient distance therefrom to allow the spray tube to pass freely therebetween. In order to maintain this distance the stop means described above may be provided for operation in response to movement of the spray tube. This operational interdependence is such that the brackets 27 maintaining the filter plates in place are reversible between an operative and an inoperative position and can return to inoperative position only after the spray tube has returned to its initial position outside of the filter plate periphery.

Since it is desirable to prevent lateral shifting of the filter plates, we provide the additional longitudinal guide means 29 and 30 arranged above the uppermost position of the spray tube and especially above the corners of the filter plates, so that such guide means cannot interfere with the movement of the spray tubes.

From the foregoing, the operation of our improved apparatus shown in FIGS. 5 and 6 will be readily understood. Flushing takes place in the following manner:

1. The spray tube 5b carrying the longitudinally spaced spray jets is moved to its lower inactive position with the previously cleaned filter plate having been moved toward the stack of plates represented at the bottom of FIG. 6.
2. The spray tube 5b is then moved into its new position in which the locking brackets 27 are moved inwardly by the retraction of cylinders 28.
3. Then conventional transport means (not shown) pulls the next plate off the stack of plates whereby such plate engages the brackets 27.
4. The guide roller 16 of the spray tube unit then moves along the path of the broken line 25 across the connecting portion 20 into the righthand track 19 and travels therein up to the upper reversal point and after reversal of its direction of movement returns to the lefthand track by connecting portion 21 to the initial position.
5. The spray water is turned on and off by suitable means such as limit switches 45.
6. The brackets 27 are then swung back out of the way whereupon the cleaned plate is moved away and a new cycle begins.

While we have shown a rocking lever 14 at the end of the tube 5b opposite the end carrying the projection 41, it will be apparent that the lever 14 could be omitted whereby that end of the tube would be carried by a suitable sleeve-like member, such as sleeve 40 shown in FIG. 2. It will also be obvious that other suitable means may be employed for shifting the tube 5b laterally, such as conventional worm gear assemblies. With such assemblies each lever would have a single arm.

While we have shown our invention in three forms, it will be obvious to those skilled in the art that it is not so limited, but is susceptible of various other changes and modifications without departing from the spirit thereof.

What we claim is:

1. Spraying apparatus for cleaning filter press plates which are slidable along horizontal guides therefor comprising,
   a. at least one spray unit having at least one tube with one row of spray nozzles at one side thereof located at spaced apart locations and directed at the vertical surface of an adjacent filter plate,
   b. means to reciprocate said spray unit over a distance equalling the distance across the filter plate to be cleaned so that spaced apart areas are sprayed by said one row of nozzles as said spray unit makes one run relative to said filter plate to be cleaned,
   c. spray nozzles positioned at the other side of said spray unit during the return run thereof between said spaced apart locations of said one row of nozzles in position to spray the areas between said spaced apart areas on the return run of said spray unit with the spray nozzles at said other side of said spray unit being staggered in a direction longitudinally of said tube relative to the spray nozzles of said one row of spray nozzles a distance of approximately half the spacing between the spray nozzles of said one row of spray nozzles,
   d. means to rotate said spray tube approximately 180° about its longitudinal axis adjacent at least one point that reverse movement takes place in the reciprocation of said spray unit, and
   e. means supplying fluid under pressure to said one row of spray nozzles as said spray unit makes said one run and to said spray nozzles located between said spaced apart locations as said spray unit makes said return run.

2. Spraying apparatus as defined in claim 1 in which a splash guard is mounted adjacent said one point that reverse movement of said spray tube takes place in position to restrain outward movement of spray as said spray tube is rotated.

3. Spraying apparatus for cleaning filter press plates which are slidable along horizontal guides therefor comprising,
   a. a spray unit having a first spray tube and a second spray tube disposed in generally parallel alignment with each other in a common vertical plane extending in the direction of movement of said spray unit,
   b. one row of spray nozzles at one side of said first spray tube located at spaced apart locations and directed at the vertical surface of an adjacent filter plate,
   c. means to reciprocate said spray unit over a distance equalling the distance across the filter plate to be cleaned so that spaced apart areas are sprayed by said one row of nozzles as said spray unit makes one run relative to said filter plate to be cleaned,
   d. spray nozzles positioned on said second spray tube between said spaced apart locations of said one row of nozzles on said first tube in position to spray the areas between said spaced apart areas on the return run of said spray unit,
   e. at least one control valve controlling the flow of spray water alternately to said spray tubes at the points that reverse movement takes place in the reciprocation of said spray unit, and
   f. the spray nozzles of said first and second tubes on the same side being staggered relative to one another approximately half the nozzle spacing in a longitudinal direction so that the spray nozzles at one side of said first spray tube apply spray water on said one run of said spray unit and the spray nozzles at the same side of said second spray tube apply spray water on the return run of said spray unit.

4. Spraying apparatus as defined in claim 3 in which said nozzles at the same side of both tubes are directed in the same direction and are so positioned that the central points of all spray streams on the surface area of the plates being cleaned are in a straight line.

5. Spraying apparatus for cleaning filter press plates which are slidable along horizontal guides therefor comprising,
   a. at least one spray unit having at least one row of spray nozzles located at spaced apart locations and directed at the vertical surface of an adjacent filter plate,
   b. means to reciprocate said spray unit over a distance equalling the distance across the filter plate to be cleaned so that spaced apart areas are sprayed by said one row of nozzles as said spray unit makes one run relative to said filter plate to be cleaned,
   c. a vertically extending threaded spindle mounted for rotation at each side of said spray unit with means synchronously connecting said threaded spindles for rotation in opposite directions,
   d. means operatively connecting said spray unit to said spindles for shifting said spray unit longitudinally approximately half the spacing between the nozzles of said one row of spray nozzles adjacent at least one point that reverse movement takes place in the reciprocation of said spray unit so that during the return run of said spray unit the spray nozzles are positioned between said spaced apart locations of said one row of nozzles in position to spray the areas between said spaced apart areas, and
   e. means supplying fluid under pressure to said pray nozzles as said spray unit makes said one run and said return run.

6. Spraying apparatus as defined in claim 5 in which said spray unit is connected at each end to a rocking lever which in turn is operatively connected to an adjacent threaded spindle.

7. Spraying apparatus as defined in claim 6 in which each said threaded spindle is the pivotal axes of its rocking lever.

8. Spraying apparatus as defined in claim 6 in which at least one of said rocking levers has an arm extending beyond its pivotal axes and said arm engages a closed loop guide track unit having two parallel vertical tracks with cross over connecting portions adjacent the ends thereof permitting said arm to travel in one vertical track on one run of said spray unit and to travel in the other vertical track on the return run of said spray unit.

9. Spraying apparatus as defined in claim 8 in which a weight loaded switch is mounted in each of said cross over connecting portions.

10. Spraying apparatus for cleaning filter press plates which are slidable along horizontal guides therefor comprising,
    a. at least one spray unit having at least one row of spray nozzles located at spaced apart locations and directed at the vertical surface of an adjacent filter plate,
    b. means to reciprocate said spray unit over a distance equalling the distance across the filter plate to be cleaned so that spaced apart areas are sprayed by said one row of nozzles as said spray unit makes one run relative to said filter plate to be cleaned, c. spray nozzles positioned on said spray unit during the return run thereof between said spaced apart locations of said one row of nozzles in position to spray the areas between said spaced apart areas on the return run of said spray unit, d. means supplying fluid under pressure to said one row of spray nozzles as said spray unit makes said one run and to said spray nozzles located between said spaced apart locations as said spray unit makes said return run, and e. a filter plate locking member mounted for movement selectively to a first location in position to engage a filter plate moved off a stack of filter plates and retain said plate at a predetermined location relative to said spray unit for cleaning by the spray from said spray nozzles and to a second location which is out of engagement with said filter plate.

11. Spraying apparatus as defined in claim 10 in which said locking device comprises an arm pivotally mounted adjacent each end of said spray unit.

12. Spraying apparatus as defined in claim 10 in which said locking device is moved by fluid pressure operated cylinders located outwardly of the plates to be cleaned selectively to operative position wherein the locking device engages a plate to be cleaned and an inoperative position wherein they are located outwardly of the periphery of said plates to be cleaned, and control means controls the movement of said cylinders whereby said locking device is shiftable into inoperative position only after the spray unit has returned to its initial position outside the periphery of the filter plate.

13. Spraying apparatus as defined in claim 10 in which said spray unit and said locking device are carried by a generally U-shaped frame being open at its base and extending over a stack of filter plates to be cleaned with said frame being supported by guide tracks on which the filter plates to be cleaned are also supported.

* * * * *